July 28, 1964 H. S. SOBEL 3,142,826
MAGNETIC CONTROL SYSTEM
Filed Aug. 10, 1960
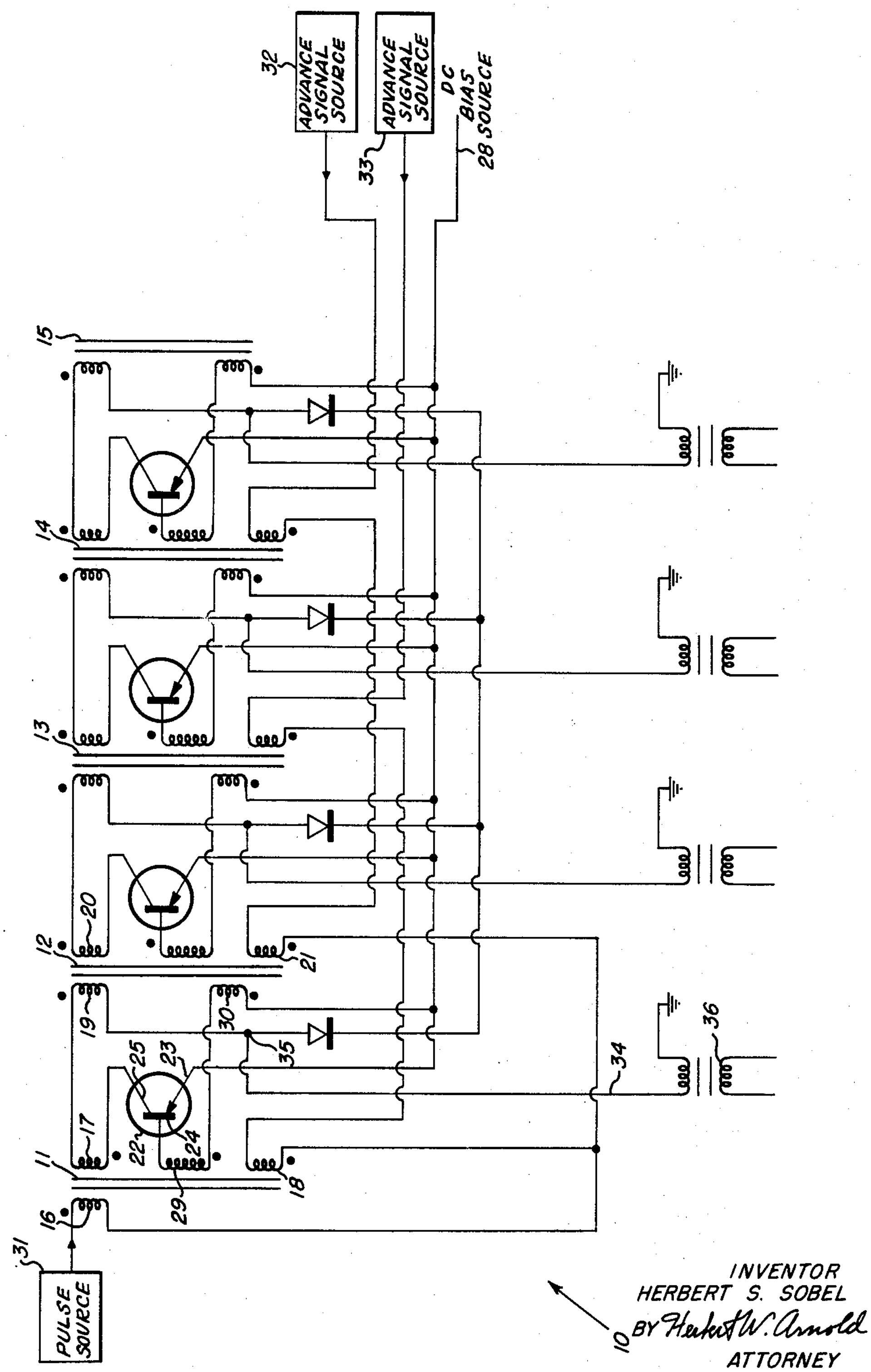
INVENTOR
HERBERT S. SOBEL
BY Herbert W. Arnold
ATTORNEY

United States Patent Office 3,142,826

Patented July 28, 1964

3,142,826

MAGNETIC CONTROL SYSTEM

Herbert S. Sobel, Natick, Mass., assignor to Raytheon Company, Waltham, Mass., a corporation of Delaware Filed Aug. 10, 1960, Ser. No. 48,651
6 Claims. (Cl. 340—174)

This invention relates to magnetic shift registers generally and more particularly to an improved high speed magnetic shift register which incorporates an inter-core switching circuit for performing a positive switching function.

Magnetic shift registers are widely used in modern computing systems to replace the fragile, bulky, vacuum tube arrays previously employed. The magnetic shift registers presently in use normally comprise a series of inter-linked magnetizable cores which may be utilized to store binary information until the storage state of a core is disturbed by a predetermined shift input signal. The magnetic cores employed in magnetic shift register systems exhibit a substantially rectangular hysteresis characteristic and are therefore capable of being driven to saturation in either of two directions. After a core has reached saturation in one direction, a remanent flux of the polarity to which the core was saturated tends to remain in the core until a saturating shift pulse of opposite polarity is applied thereto. The two states of remanence provided by magnetic shift register cores, enable them to store binary information, and to produce a high output voltage when this storage state is disturbed by a shift signal of opposite polarity. The core elements are normally cascaded so that the output signal from one becomes the input to a succeeding magnetic core. Each core can only store a single binary digit during any one period of time, and two core per bit shift registers require two magnetic cores for the transfer of information from one core to the next in a core array.

In a two core per bit shift register, while information is being stored in one core, the adjacent core in the array is being cleared so that it will be free to receive further information. Subsequently a shift pulse is fed to the first core to clear it and cause the transferral of the information stored therein to the adjacent core. The conventional two core per bit magnetic shift register uses a fixed volt-time pulse to instigate this shifting of logic from core to core. In order to properly saturate a magnetic core and cause the storage or the transfer of binary information, it is necessary that the flux within the core be large enough to change the orientation of the magnetic domains so that the core will be shifted from one saturated state to another. The value of magnetic flux required to instigate this change of state is not a constant in most magnetic cores, and varying degrees of flux are often required, depending on the characteristics of the individual core utilized. This saturation flux variance gives rise to performance problems when magnetic cores are employed within a shift register array, for the fixed volt-time shift pulse provided by the shift register might not be of sufficient time duration to cause all of the magnetic cores to completely change their saturation state. It is difficult to select a number of special magnetic cores having equal saturation characteristics, and therefore the reliability of conventional magnetic shift registers is decreased.

The primary object of this invention is to provide an improved high speed magnetic shift register.

Another object of this invention is to provide a high speed magnetic shift register which is capable of reliable operation without the requirement of specially selected magnetic cores having equal saturation characteristics.

A further object of this invention is to provide a high speed magnetic shift register including an inter-core coupling circuit which provides a positive switching function.

Another object of this invention is to provide a high speed magnetic shift register employing an inter-core switching circuit which insures that current will be supplied to two adjacent magnetic cores until both cores have completed a change in state.

A still further object of this invention is to provide a magnetic shift register employing an inter-core switching circuit which is capable of performing a pulse distribution function to selectively provide output pulses to multiple output channels.

With the foregoing and other objects in view, the invention resides in the following specification and appended claims, certain details of construction of which are illustrated in the accompanying single figure drawing which is a schematic diagram of the circuitry of the present invention.

Basically the magnetic shift register of the present invention includes a plurality of cascaded magnetic cores which include a controlled switching unit in the coupling circuit between each individual core. This switching unit is controlled by a feedback loop which senses the condition of adjacent magnetic cores within the shift register. The circuitry for performing this function is illustrated by the figure where the magnetic shift register of the present invention, indicated generally at 10, includes a plurality of interconnected magnetic storage units 11, 12, 13, 14 and 15. Any number of magnetic storage units of the type illustrated might be utilized to provide the desired storage and pulse shifting function of the register. Since each of the magnetic storage units 11, 12, 13, 14 and 15 of the magnetic shift register 10 includes identical circuitry, for purposes of description, the circuitry and operation of units 11 and 12 will be described in detail as being illustrative of the inter-action between all of the storage units of the shift register. Storage unit 11 is provided with a conventional input winding 16, an output winding 17 and a shift or transfer winding 18, while the storage unit 12 includes an input winding 19, an output winding 20 and a shift or transfer winding 21. The output winding 17 of the storage unit 11 is electrically connected to the input winding 19 of the storage unit 12 to form a coupling loop between the units 11 and 12. This inter-unit coupling loop includes a transistor 22 having an emitter electrode 23, a base electrode 24, and a collector electrode 25. Collector electrode 25 is connected in series with the output winding 17 of the storage unit 11, while the emitter electrode 23 of the transistor 22 is furnished with a suitable D.C. bias by a line 28 extending from a D.C. bias source, not shown. Thus a complete inter-core transfer loop is provided through the interconnection of transistor 22, output winding 17 of the storage unit 11, and input winding 19 of the storage unit 12. The base electrode 24 of the transistor 22 is serially connected with a pair of positive feedback windings 29 and 30 to provide an inter-core sensing circuit. Winding 29 is positioned to sense the degree of saturation existing in the magnetic storage unit 11, while the winding 30 detects the degree of saturation of the magnetic storage unit 12.

In the operation of the shift register 10 as thus far described, a positive information pulse is applied to the input winding 16 of the magnetic storage unit 11 from a suitable pulse source 31. This input information pulse causes a binary bit "1" to be stored in the storage unit 11 while the storage unit 12 remains in a cleared or "0" state. This binary bit may be transferred from storage unit to storage unit by the application of shift or advance signals from advance signal sources 32 and 33 to the shift windings of the magnetic storage units. Pulse sources 32 and 33 provide a fixed volt-time pulse which shifts the logic from storage unit to storage unit. After information has been supplied to the storage unit 11 from the input source 31, a small positive pulse is applied from pulse source 33 to the shift winding 18. This shift pulse causes the magnetic storage unit 11 to begin a change of state and to pass the stored information from the output winding 17 to the input winding 19 of storage unit 12. The build up of current in the output winding 17 biases the collector 25 of the transistor 22 positively, while the positive pulse across shift winding 18 causes the induction of a negative voltage in the sensing winding 29. This negative voltage in winding 29 causes the transistor 22 to conduct, while the build-up of the positive pulse in the collector 25 of the transistor 22, the output winding 17 of the storage unit 11, and the input winding 19 of the storage unit 12 induces a greater negative voltage pulse in the sensing windings 29 and 30. This voltage build-up continues until the transistor 22 is driven into saturation, and a negative voltage is applied to the base of the transistor 22 until both of the storage units 11 and 12 are saturated. When this saturation state occurs, the flux in both the storage units 11 and 12 becomes constant and voltage is no longer applied to the transistor 22. When this condition occurs, the transistor 22 becomes cut off. Although the state changing shift pulse from the pulse source 33 might be of a shorter duration than the time required to completely change the state of the magnetic storage unit 12, the state changing current will be provided primarily by the transistor 22 until a complete change of state is affected. Next a positive pulse may be applied from the shift pulse source 32 to the shift winding 21 of storage unit 12 to cause the storage units 12 and 13 to change state in the manner previously described in connection with the storage units 11 and 12. Thus the initial stored pulse, which originated at the input winding 16 of the storage unit 11, may be propagated through the entire shift register. The speed of this shifting operation is limited only by the time required to saturate each individual storage unit of the register.

The magnetic shift register previously described may be used as a pulse distributor by providing an output connection to a pulse transformer from the output of the transistors in the coupling circuits between the individual magnetic storage units 11, 12, 13, 14 and 15. This circuit configuration is illustrated in the drawing wherein a pulse distribution line 34 is connected at 35 to one side of the input winding 19 of the storage unit 12 so as to receive the output pulse transferred from the transistor 22. This pulse is directed by the line 34 to a pulse transformer 36, which in turn directs the pulse to a gating circuit provided in a suitable multiplex channel, not shown. As the information pulse from the pulse source 31 is shifted through the shift register 10, gating pulses will be supplied to gate multiplex channels equal in number to the number of storage units within the shift register.

It will be readily apparent to those skilled in the art that the present invention provides a novel magnetic shift register including an inter-core switching circuit which insures that current will be supplied to two adjacent magnetic cores until both cores have completed a change in state. The arrangement and types of components utilized within this invention may be subject to numerous modifications well within the purview of this inventor who intends only to be limited to a liberal interpretation of the specification and appended claims.

I claim:

1. A magnetic shift register comprising a plurality of cascaded magnetic storage units of a material having a substantially rectangular hysteresis curve characteristic, each of said units having bi-stable states of magnetic resonance, coupling means interconnecting each pair of adjacent storage units, an input source of logic pulses connected to the first storage unit of said pair of adjacent magnetic storage units, means to selectively supply shift pulse potential to said first of said adjacent magnetic storage units to initiate a change of state therein, and switching means included in said coupling means to insure the provision of shift pulse potential to said two adjacent storage units until a complete change of state has been initiated therein.

2. A magnetic shift register comprising a plurality of cascaded magnetic storage units of substantially rectangular hysteresis loop material, coupling means interconnecting each pair of adjacent storage units, an input source of logic pulses connected to the first of said storage units, said first storage unit being one of said pair of adjacent storage units, means to selectively supply shift pulse potential to two adjacent storage units to initiate a change of state therein, a feedback sensing loop between each of said storage units to sense the magnetic flux of each of said storage units, and switching means included in said coupling means, each said switching means controlled by said sensing loops to provide shift potential to said two adjacent storage units until a complete change of state has been initiated therein.

3. A magnetic shift register comprising a plurality of cascaded magnetic storage units of a material having a substantially rectangular hysteresis curve characteristic, a coupling loop interconnecting each pair of adjacent storage units, an input source of logic pulses connected to the first storage unit of said pair of adjacent storage units, means to selectively supply shift pulse potential to the first storage unit of said two adjacent storage units to initiate a change of state therein, a switching transistor including base, emitter and collector electrodes between each of said storage units, the emitter and collector electrodes being connected in each coupling loop, a feedback sensing loop for sensing the magnetic state of each said adjacent storage units coupled to said base electrode, said feedback loop causing said transistor switch to conduct and supply potential to said two adjacent storage units until a complete change of state has been initiated therein.

4. A magnetic shift register comprising a plurality of cascaded magnetic storage units of a material having a substantially rectangular hysteresis curve characteristic, a coupling loop interconnecting adjacent pairs of storage units, an input source of logic pulses connected to the first storage unit of said pair of adjacent storage units, a plurality of means to selectively supply shift pulse potential to two adjacent storage units to initiate a change of state therein, a transistor switching unit including base, collector, and emitter electrodes between each of said storage units, the emitter and collector electrodes being connected in each of the coupling loops, serially connected feedback windings coupled to the base electrode of said switching transistor, each of said feedback windings sensing the magnetic state of one of said two adjacent storage units to cause said transistor switching unit to conduct and provide a shift potential to said two adjacent storage units until a complete change of state has been initiated therein.

5. A magnetic shift register comprising a plurality of cascaded magnetic storage units made of a material having a substantially rectangular hysteresis curve characteristic, coupling means interconnecting adjacent pairs of said storage units, an input source of logic pulses connected to the first of said storage units, the first of said storage units being one of said pair of adjacent storage units, means to selectively supply shift pulse potential to said first of said pair of adjacent magnetic storage units to initiate a change of state therein, switching means included in said coupling means to insure the provision of shift potential to said two adjacent storage units until a complete change of state has been initiated therein, feedback sensing means to sense the magnetic state of each of said storage units to control the action of said switching means, and output means connected to said coupling means comprising pulse transformer and diode means.

6. A magnetic shift register comprising a plurality of cascaded magnetic storage units of a material having a substantially rectangular hysteresis curve characteristic, each of said units having bi-stable states of magnetic resonance, coupling loops interconnecting adjacent pairs of said storage units, an input source of logic pulses connected to the first storage unit of said pair of adjacent storage units, a plurality of means to selectively supply shift pulse potential to two adjacent storage units to initiate a change of state therein, a transistor switching unit including collector, emitter and base electrodes between each of said storage units, the emitter and collector electrodes of said transistor switching unit being connected in each coupling loop, serially connected feedback windings coupled to the base electrode of said transistor switching unit, said feedback windings sensing the magnetic state in said adjacent storage units to cause said transistor switching unit to conduct and insure the provision of shift potential to said two adjacent storage units until a complete change of state has been initiated therein, an output circuit pulse distributor means connected to said coupling loops comprising pulse transformer and diode means to provide a continuous flow of output pulses during the conduction of said transistor switching unit.

References Cited in the file of this patent

UNITED STATES PATENTS

| | | |
|---|---|---|
| 2,952,841 | Lund | Sept. 13, 1960 |
| 2,963,688 | Ameniya | Dec. 6, 1960 |
| 2,968,796 | Lane et al. | Jan. 17, 1961 |
| 2,978,682 | Green | Apr. 4, 1961 |